(12) United States Patent
Prenzel

(10) Patent No.: US 6,422,355 B1
(45) Date of Patent: Jul. 23, 2002

(54) DISC BRAKE

(75) Inventor: Harald Prenzel, Werdenstein (DE)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/829,162

(22) Filed: Apr. 9, 2001

(51) Int. Cl.$^7$ ............................................. F16D 55/00
(52) U.S. Cl. ................................. 188/73.32; 188/73.31
(58) Field of Search ........................... 188/72.4, 73.31, 188/73.32; 277/637, 641, 642, 643

(56) References Cited

U.S. PATENT DOCUMENTS

| | | | | |
|---|---|---|---|---|
| 3,500,967 A | * | 3/1970 | Nolan | 188/72.4 |
| 3,517,782 A | * | 6/1970 | Hayes | 188/152 |
| 4,809,821 A | * | 3/1989 | Fulmer | 188/72.4 |
| 5,558,345 A | * | 9/1996 | Kobayashi et al. | 188/72.4 |

* cited by examiner

Primary Examiner—Christopher P. Schwartz
Assistant Examiner—Thomas J. Williams

(74) Attorney, Agent, or Firm—Leo H. McCormick, Jr.; Warren Comstock

(57) ABSTRACT

A boot-seal assembly (38) for sealing an actuation chamber (36) defined by a piston (34) being located in a bore (32) of a caliper (16) of a disc brake (10). The bore (32) has a first diameter (32a) separated from a second diameter (32b) by an annular shoulder (33), a step (37) adjacent the annular shoulder (33) and an annular groove (35) adjacent the step (37). The boot-seal assembly (38) include a square seal (50) and a boot (52), each of which surround the piston (34). The boot (52) has a molded cylindrical rubber body (54) with a metal insert (64). The metal insert (64) creates a radial outward projection (60) that extends from a first end (56) of the boot (52) and a radial inward lip (62) that extends from a second end (58) of the boot (52). The piston (34) is inserted in bore (32) and an initial force is applied to the second end (58) of the cylindrical body (54) to bring the first end (56) into contact with the seal (50) and position the seal (50) on the step (37). A further force is applied to the second end (58) of the boot (52) to move the seal (50) onto the step (37) and thereafter bring the seal (50) into engagement with the annular shoulder (33). When the seal (50) engages the annular shoulder (33), the radial outward projection (60) snaps into the annular groove (35) to lock the boot (52) onto the caliper (16).

14 Claims, 1 Drawing Sheet

DISC BRAKE

This invention relates to a boot that engages a caliper to hold a seal in a bore that retains an actuation piston for a disc brake.

BACKGROUND OF THE INVENTION

In disc brakes, it is common for a caliper to straddle a rotor that is fixed to an axle of a vehicle. The caliper is located on a yoke that is secured to the housing of the vehicle and has a bore therein which holds an actuation piston. A seal located in a groove in the caliper engages the piston to seal the bore and define an actuation chamber. A first friction member is connected to the actuation piston and a second friction member is connected to an arm extending from the caliper. The first and second friction members are located on opposite sides of the rotor and when pressurized fluid is supplied to the actuation chamber, the piston and caliper move in such a manner that the first and second friction members engage the rotor to effect a brake application. The following U.S. Patents are illustrative of disc brake and their corresponding functional operation: U.S. Pat. Nos. 3,113,643; 3,421,604; 3,442,356; 3,868,001; 3,912,051; 3,998,466; 4,530,423; 5,660,253; 5,700,067; 5,713,435; 5,826,681; 5,845,747; 6,000,506; 6,044,936; 6,073,733; and 6,135,245. All of the disc brakes disclosed by these patents while possessing different structural components operate in a manner to effect a brake application in a manner as describe above. It should be noted that in of the above patents a disc brake is disclosed as having a groove located in the bore of the caliper to retain a seal that engages the piston to seal the actuation chamber. In the manufacture of the caliper the groove is machined in the bore and as a result all material removed from the housing to create the groove must be removed before the seal is inserted in the groove. Unfortunately, it is possible that some material in the form of chips may be retained in the groove and when the seal is inserted into the groove some damage may occur. The damage may take the form of a cut to the seal or the seal may not fully engaging the bottom of the groove and as a result a leak path could occur for pressurized fluid presented to the actuation chamber with the environment. In addition, during the assembly of this type disc brake, a substantial force is required to insert the piston into the bore and the seal could actually be rolled or twisted which also could result in a leak path as described above.

SUMMARY OF THE INVENTION

A primary object of the present invention is to simplify the manufacture of a caliper for a disc brake by reducing the possibility of retention of material from a machining process in a groove which could later contribute to the development of a leak path and to provide a piston and associated seal-boot assembly which is easily inserted into a bore to form a sealed actuation chamber for a disc brake.

In more particular detail, the disc brake of the present invention includes a caliper that straddles a rotor and is retained on a yoke attached to a vehicle. The caliper has a bore therein and with a piston defines an actuation chamber. A seal and bearing arrangement that is connected to the caliper engages the piston to seal the actuation chamber from the surrounding environment. A first friction member is attached to the piston and a second friction member is attached to an arm that extends from the bridge of the caliper. When pressurized fluid from a source is presented to the actuation chamber, the pressurized fluid acts on the piston and caliper to move the first and second friction members into engagement with the rotor to effect a brake application. The disc brake is characterized by the bore in the caliper having a first diameter separated from a second diameter by an annular shoulder and a groove located in the second diameter to create a step adjacent the annular shoulder and by a boot which holds the seal against the annular shoulder. The boot has a cylindrical body with a first end with a radial outward projection that extends therefrom and a second end with a radial inward lip that extends therefrom. The seal is initially placed on the peripheral surface of the piston and the boot is thereafter placed adjacent the seal. A force is applied to the second end of the boot to move the first end of the boot into engagement with the seal and the second diameter of the bore. As the boot moves the seal into the bore, the outward radial projection of the boot engages the second diameter of the bore and flexes toward the piston. The force on the boot moves the seal past the annular groove and onto the step to bring the seal into engagement with annular shoulder. When the seal engages the annular shoulder, the resiliency of the boot causes the radial outward projection on the first end snaps into the annular groove and locks boot and correspondingly the seal onto the caliper.

An advantage of the disc brake of the present invention resides in the ease whereby a piston and seal-boot assembly is placed in a bore to seal an actuation chamber of a disc brake.

A further advantage of the disc brake resides in a boot that holds a seal in a bore that engages a piston to seal the bore and define an actuation chamber within the housing of a caliper.

DETAILED DESCRIPTION

Figure 1:
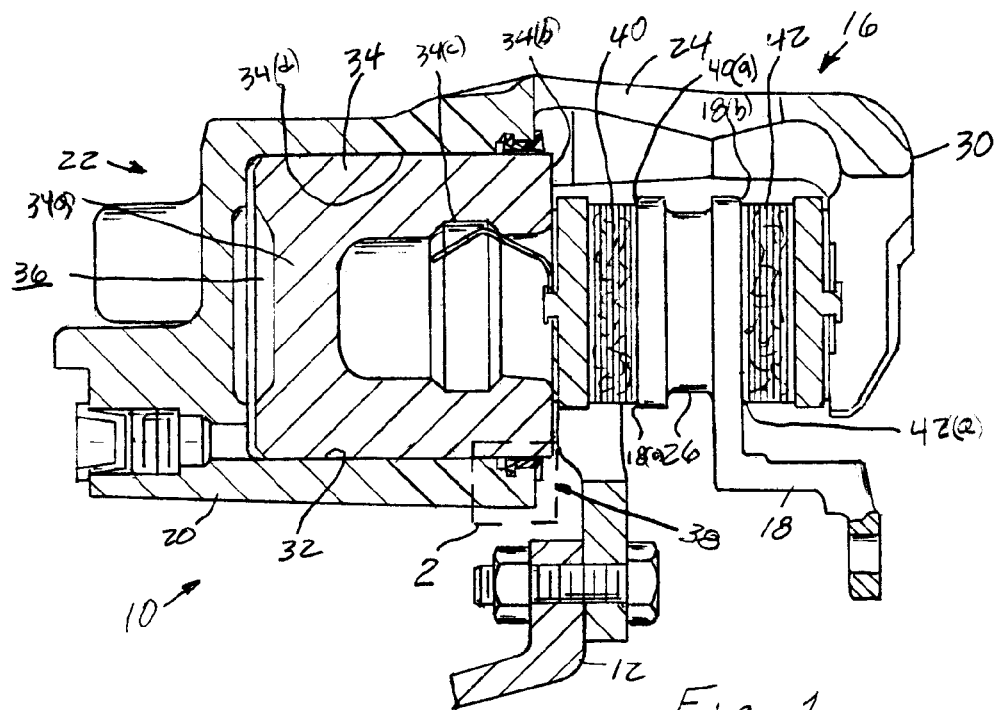
FIG. 1 is a schematic illustration of a sectional view of a disc brake having a caliper with a bore therein for retaining a piston with a seal held in the bore by a boot arrangement to seal an actuation chamber within the bore in a manner disclosed by the present invention.

The disc brake 10 shown in FIG. 1 includes a torque member 12, which is connected to wheel or axle support of a vehicle. A caliper 16 is movably supported on a yoke of the torque member 12 and straddles a rotor 18 that is attached to the hub on an axle for a wheel of the vehicle.

The caliper 16 includes an inner leg 20 which forms a housing for an actuator assembly 22, a bridge portion 24 that extends over the outer surface 26 of rotor 18 and a outer leg 30. The housing of the actuator assembly 22 has a bore 32 therein that retains a piston 34 to define an actuator chamber 36 which is connected to a source of pressurized fluid. A seal-bearing assembly 38 is attached to the housing of the actuator assembly 22 and with a piston 34 seals the actuator chamber 36 from the surrounding environment. A first friction member 40 is connected to piston 34 while a second friction member 42 is connected to the outer leg 30 in such a manner that surface 40a on a first friction member 40 and surface 42a on a second friction member 42 are aligned with corresponding surfaces 18a and 18b on rotor 18 in a parallel relationship.

When an operator desires to effect a brake application of the vehicle, pressurized fluid is supplied to actuator chamber 36. The pressurized fluid presented to the actuator chamber 36 acts on piston 34 and outer leg 30 to move surface 40a on the first friction member 40 and surface 42a on the second friction member 42 into engagement with corresponding surfaces 18a and 18b on rotor 18 to inhibit rotation of the rotor 18 and effect a brake application for the vehicle.

Figures 2, 3:
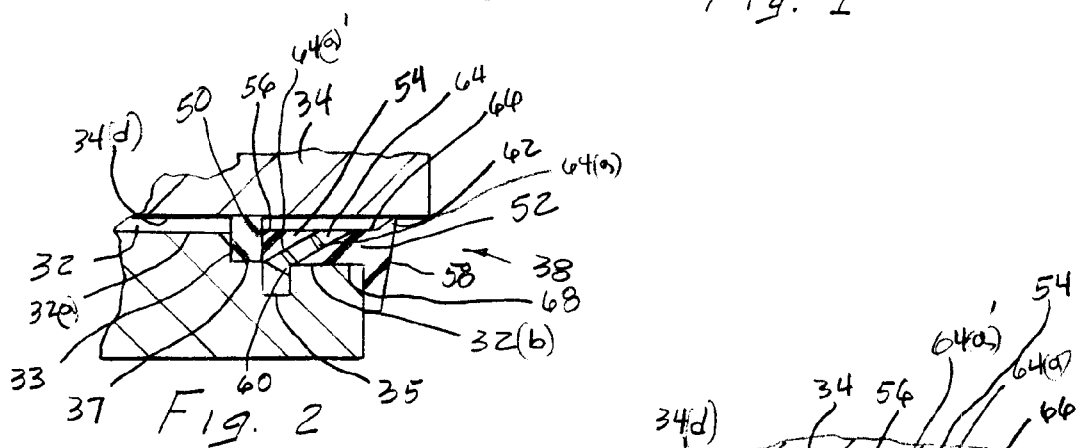
FIG. 2 is an enlarged sectional view of the conscribed section 2 of FIG. 1.
FIG. 3 is a sectional view of the seal—boot arrangement shown in FIG. 2 during the insertion of the piston and boot arrangement into the bore of FIG. 1.

As shown in more particular detail in FIG. 2, the bore 32 of the housing for the actuator assembly 22 has a first diameter 32a separated from a second diameter 32b by an annular shoulder 33 and a groove 35 located in the second diameter 32b to create a step adjacent 37 adjacent the annular shoulder 33. Bore 32 has a tapped surface 33a that provides a transition between the first diameter 32a to the annular shoulder 33 and as later herein described, functions with the seal 50 of the seal-boot assembly 38 to assist in the retraction of the piston 34 after a brake application.

The seal-boot assembly 38, as shown in detail in FIGS. 2 and 3, includes piston seal 50 and a boot 52. The seal 50 is a square cut member which is positioned on the peripheral surface 34d of piston 34 and designed to radially engage the second diameter 32b on step 37 of bore 32 and axially engage the annular shoulder 33 to seal the actuator chamber 36. The seal 50, in addition to sealing actuator chamber 36, also provides a bearing surface to maintain piston 34 in an axial alignment within bore 32 such that the face 40a on first friction member 40 is maintained in a parallel relationship with surface 18a on rotor 18.

Figure 4:
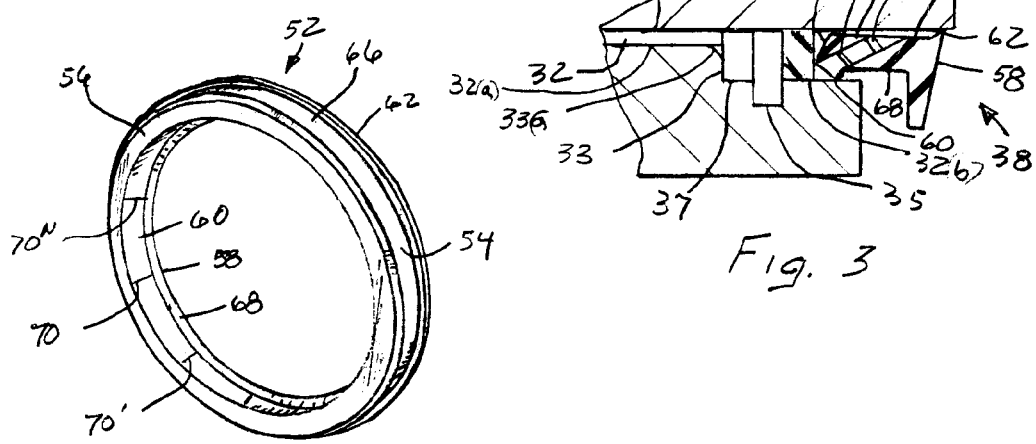
FIG. 4 is a perspective view of the boot of FIG. 1.

The boot 52, which is best illustrated in FIGS. 2,3 and 4, has a substantially cylindrical body 54 with a first end 56 and a second end 58. The first end 56 has a radial outward projection 60 extending therefrom while the second end 58 has a radial inward lip 62 extending therefrom. The cylindrical body 54 is made of a molded rubber member with a metal insert 64. The metal insert 64 has an angular relationship with the cylindrical body 54 and extends from an internal first surface 66 on the cylindrical body 54 to an external second surface 68. The metal insert 54 is positioned within the cylindrical body 54 to define the radial outward projection 60 that forms a perpendicular relationship with the external surface 68. In more particular detail, the metal insert 64 is a continuos annular member that may include a plurality of openings 64a,64a' to facilitate in the molding with rubber. Under some circumstances, rather than the metal insert 64 being continuous, slits 70,70', . . . 70n may be provided to create a plurality of hooks or fingers adjacent the first end 56 of the cylindrical body 54. The molded cylindrical body 54 is designed is designed to be such that when radial outward projection 60 is located in annular groove 35 to lock boot 52 onto the housing of the actuator assembly 20, external surface 68 on the cylindrical body 54 is substantially parallel with and engages the second diameter 32b of bore 32. Further, with radial outward projection 60 positioned in groove 35, the first end 54 holds seal 50 in engagement with annular shoulder 33 and lip 62 engages piston 34 to seal the actuation chamber 36.

Method of Assembly

When an operator desires to manufacture a disc brake 10 of the present invention, the following steps are employed to assemble the components into a unitary structure, which is thereafter joined to a torque member 12 on a vehicle:

a caliper 16 is obtained from a source of supply, the caliper 16 being defined by a housing having a bore 32 therein with a first diameter 32a separated from a second diameter 32b by an annular shoulder 33 and a radial groove 35 located adjacent a step 37 in the second diameter 32b;

an actuation piston 34 is obtained from a source of supply, the actuation piston 34 being defined by as a cylinder having a closed end 34a and an opened end 34b with an annular groove 34c adjacent the opened end 34b and an external peripheral surface 34d that extends from the closed end 34a to the opened end 34b;

a seal 50 is placed on a peripheral surface 34d of the actuation piston 34, the seal 50 being defined as a square cut member;

a boot 52 is obtained from a source of supply, the boot 52 being defined by a molded rubber or plastic member having a cylindrical body 54 with a first end 56 and a second end 58, the cylindrical body 54 having an annular metal insert 64 with a radial outward projection 60 which is perpendicular to an external surface 68 on the cylindrical body 54. The radial outward projection 60 extends from the first end 56 to define a locking member while a radial inwardly extension extends from the second end 68 to define a lip 62;

the boot 52 is placed on peripheral surface 34d of the actuation piston 34 adjacent the seal 50;

the actuation piston 34 with the seal 50 and boot 52 thereon are manually inserted in bore 32 such that seal 50 engages the second diameter 32b;

an initial force is applied to the opened end 34b of piston 34 and the closed end 34a is moved through the second diameter 32b and into the first diameter 32a toward the bottom 32c of bore 32;

a force is thereafter applied to the second end 58 of boot 52 to bring the first end 56 of the boot 52 into engagement with seal 50 and move the seal 50 along the second diameter 32b, past the radial groove 35, onto step 37 in bore 32 and toward annular shoulder 33. Movement of seal 50 in the second diameter 32b is unobstructed and with the dual diameter of bore 32 even if material (a chip) removed during machining of the housing should remain in the bore 32 such material would be moved into groove 35 by the seal 50. With the material in the groove 35, the seal 50 would pass over the material (chip) and thus no damage would be inflicted on the surface of seal 50. During movement of the seal 50 toward annular shoulder 33, radial outward projection 60 on the metal insert 64 engages the second diameter 34b causing the first end 56 to flexes toward the peripheral surface 34d in a manner as illustrated in FIG. 3. The rubber cylindrical body 54 has sufficient resiliency to allow first end 56 to move the seal 50 toward the annular shoulder 33 while riding or moving on the second diameter 32b without the need for excessive force such that seal 50 is easily moved toward the annular shoulder 33;

a further force is applied to the second end 68 of boot 52 to bring seal 50 into engagement with the annular shoulder 33. When seal 50 engages annular shoulder 33, the radial outwardly extending projection 60 on the metal insert 64 snaps into annular groove 35 to lock the boot 52 to the caliper 16. With the radial outward extending projection in groove 35, seal 50 is axially held against the annular shoulder 33 and at the same time lip 62 radially engages peripheral surface 34d on piston 34 to seal the actuation chamber 36 created by positioning piston 34 in bore 32. When radial outward projection 60 snaps into groove 35, the cylindrical body 54 of the boot 52 is substantially parallel with the peripheral surface 34d of the piston 34 and the second diameter 32b of bore 32. Later, when caliper 16 is later located on yoke of the torque member 12, piston 34 is aligned in a perpendicular relationship with rotor 18. During operation, with the boot 52 locked to the caliper 16, the lip 62 wipes the peripheral surface 34d to reduce the communication of contamination to seal 50; and Thereafter, a first friction member 40 is attached to piston 34 by locating a clip in groove 34c adjacent the open end 34b and a second friction member 42 is attached to the outer leg 30 of the caliper 16 to complete the assembly of the caliper 16 for disc brake 10. The disc brake 10 is now ready for installation on the yoke of the torque member 12 that is bolted to vehicle.

Mode of Operation

The disc brake 10 is installed in a vehicle by bolting torque member 12 to the wheel or axle support in a manner such that surface 40a and 42a on the first and second friction members 40 and 42 are aligned in planes parallel with surfaces 18a and 18b on rotor 18. When an operator desires to effect a brake application, pressurized fluid is supplied to actuator chamber 36. The pressurized fluid acts on piston 34 and the bottom 32c of bore 32 to develop a force which causes surfaces 40a and 42a on the first and second friction members 40 and 42 to correspondingly move into engagement with surfaces 18a and 18b and retard the rotation of rotor 18 to effect a brake application. The pressurized fluid in actuation chamber 36 also acts on seal 50 that is held in a substantially stationary location in bore 32 by the first end 56 of boot 52. Seal 50 may be compressed by the pressurized fluid and actually move toward the first end 56 of boot 52 which is held stationary by the engagement of the radial outward projection 60 with groove 35. In addition to axial compression, the seal 50 also experiences corresponding radial compression to assure that the pressurized fluid is retained in actuation chamber 36 and not communicated to the surrounding environment through a leak path. On termination of the communication of pressurized fluid to the actuation chamber 36, seal 50 relaxes and pulls piston 34 back to a position as illustrated in FIG. 1. The taper 33a that connects the annular shoulder 33 with the first diameter 32a allows the end of seal 50 to move into the first diameter 32a and help define the running clearance between the first and second friction members 40 and 42 and surfaces 18a and 18b on rotor.

I claim:

1. A method of joining a seal to a caliper to position said seal in a bore that retains an actuation piston of a disc brake, comprising the steps of:

obtaining a caliper from a source, said caliper having a bore therein with a first diameter separated from a second diameter by an annular shoulder, said bore having a radial groove located in said second diameter;

obtaining an actuation piston from a source;

placing a seal on a peripheral surface of said actuation piston;

obtaining a boot from a source, said boot having a cylindrical body with a first end and a second end, said first end having an radial outwardly extending projection;

placing said boot on said actuation piston adjacent said seal;

inserting said actuation piston in said bore and moving said actuation piston through said second diameter and into said first diameter;

applying an initial force on said boot to bring said first end into engagement with said seal to move said seal in said second diameter past said radial groove and onto a step in said bore adjacent said annular shoulder; and applying a further force to bring said seal into engagement with said annular shoulder and allow said radial outwardly extending projection to be located in said annular groove to secure said boot with said caliper and hold said seal against said annular shoulder.

2. The method as recited in claim 1 wherein the step of said initial force acting on said boot causes said first end of said boot to flex toward said piston with said radial outwardly extending projection engaging said second diameter in said bore and on engagement of said seal with said annular shoulder said first end moving toward said second diameter as said radial outwardly extending projection moves into said annular groove.

3. The method as recited in claim 2 wherein the step of said radial outwardly extending projection of said boot moving into said annular groove causes a lip on said second end of said boot to engage said peripheral surface on said actuation piston.

4. The method as recited in claim 1 wherein said radial outwardly extending projection is made up of a plurality of hooks and on being located in said annular groove brings said cylindrical body into engagement with said second diameter of said bore, said plurality of hooks on being located in said annular groove to lock said boot onto said caliper.

5. The method as recited in claim 4 wherein the step of moving said seal onto said step allows said seal to define a bearing surface for locating said actuation piston on an axial center of said bore.

6. A disc brake having a caliper which straddles a rotor, said caliper having a bore and with a piston located in the bore to define an actuation chamber, a seal-bearing arrangement connected to said caliper and engaging said piston to seal said actuation chamber from the surrounding environment, a first friction member connected to said piston and a second friction member connected to said caliper, said actuation chamber on being presented pressurized fluid from a source acting on said piston and caliper to develop a force for moving said first and second friction members into engagement with said rotor to effect a brake application, said disc brake being characterized by said bore having a first diameter separated from a second diameter by an annular shoulder and a groove in said second diameter to create a step adjacent said annular shoulder; and by a boot having a cylindrical body with a first end and a second end, said first end having a radial outward projection that extends therefrom and is located in said groove to position said seal on said step and bring said seal into engagement with said annular shoulder while locking said boot onto said caliper, said second end of said boot has an annular lip that engages said piston to provide a wiping surface to reduce the communication of any contamination to said seal.

7. The disc brake as recited in claim 6 wherein said radial annular projection is characterized by hooks that extend from the cylindrical body of said boot.

8. The disc brake as recited in claim 7 wherein said bore of said caliper is further characterized by an annular taper that extends from said first diameter to said annular shoulder, said seal on termination of the presentation of pressurized fluid to said actuation chamber pulling said piston back to a location in said bore such that said first and second friction members move away from said rotor.

9. The disc brake as recited in claim 8 wherein said boot is characterized by a molded rubber member with a metal insert, said metal insert defining said radial outward projection that engages said groove in said second diameter to retain said boot in said bore on the presentation of pressurized fluid in said actuation chamber.

10. A disc brake having a caliper which straddles a rotor, said caliper having a bore and with a piston located in the bore to define an actuation chamber, a seal-bearing arrangement connected to said caliper and engaging said piston to seal said actuation chamber from the surrounding environment, a first friction member connected to said piston and a second friction member connected to said caliper, said actuation chamber on being presented pressurized fluid from a source acting on said piston and caliper to develop a force for moving said first and second friction members into engagement with said rotor to effect a brake application, said disc brake being characterized by said bore having a first diameter separated from a second diameter by an annular shoulder and a groove in said second diameter to create a step adjacent said annular shoulder; and by a boot having a cylindrical body with a first end and a second end, said first end having a radial outward projection that extends therefrom and is located in said groove to position said seal on said step and bring said seal into engagement with said annular shoulder while locking said boot onto said caliper, said boot having a rubber member with a metal insert, said metal insert defining an angular relationship with said rubber member such that a square face thereon is located in said groove when said cylindrical body is substantially parallel with and engages said second diameter of said bore.

11. The disc brake as recited in claim 10 wherein said second end of said cylindrical body has an inward projecting lip that engages said piston to wipe a peripheral surface thereon and prevent the communication of contamination to said seal.

12. The disc brake as recited in claim 10 wherein said metal insert has a plurality of fingers that extend from a base, said base having a plurality of openings that allow said rubber member to surround said metal insert and form a unitary structure.

13. The disc brake as recited in claim 10 wherein said cylindrical body is rubber member with a concentric metal insert, said metal insert having a first end and a second end, said first end having a flange thereon which defines said radial outward projection that is located in said groove to lock said boot onto said caliper.

14. The disc brake as recited in claim 13 wherein said rubber member allows said metal insert to flex toward said piston on engagement of said flange with said second diameter of said bore and urges said flange into said groove on engagement of said seal with said annular shoulder.

* * * * *